(12) United States Patent
Kawai

(10) Patent No.: US 8,510,483 B2
(45) Date of Patent: Aug. 13, 2013

(54) TRANSMITTER DEVICE, RECEIVER DEVICE, TRANSMISSION METHOD, RECEPTION METHOD, AND TRANSMITTER/RECEIVER DEVICE

(75) Inventor: Shigehiro Kawai, Kanagawa (JP)

(73) Assignee: Sony Corporation (JP)

( * ) Notice: Subject to any disclaimer, the term of this patent is extended or adjusted under 35 U.S.C. 154(b) by 149 days.

(21) Appl. No.: 13/110,300

(22) Filed: May 18, 2011

(65) Prior Publication Data

US 2011/0292295 A1    Dec. 1, 2011

(30) Foreign Application Priority Data

May 25, 2010 (JP) ................. P2010-119134

(51) Int. Cl.
*G06F 3/00* (2006.01)
*G06F 13/00* (2006.01)

(52) U.S. Cl.
USPC ............. 710/33; 710/15; 710/29; 725/143; 725/135

(58) Field of Classification Search
USPC ............. 710/15–19, 29, 33; 725/135, 143, 725/147–151
See application file for complete search history.

(56) References Cited

U.S. PATENT DOCUMENTS

| | | | | |
|---|---|---|---|---|
| 4,789,906 A | * | 12/1988 | Urata et al. | 386/269 |
| 5,526,136 A | * | 6/1996 | Hisikura et al. | 386/349 |
| 7,583,753 B2 | * | 9/2009 | Okamura | 375/296 |
| 8,255,583 B2 | * | 8/2012 | Oh | 710/15 |
| 2008/0016528 A1 | * | 1/2008 | Yoshinaga | 725/39 |
| 2009/0007213 A1 | * | 1/2009 | Takezaki | 725/132 |
| 2009/0138935 A1 | * | 5/2009 | Ohkita | 725/134 |
| 2009/0238553 A1 | | 9/2009 | Tamura | |
| 2010/0043045 A1 | * | 2/2010 | Shakiba et al. | 725/119 |
| 2010/0131991 A1 | * | 5/2010 | Tao | 725/80 |
| 2010/0271548 A1 | * | 10/2010 | Kabuto | 348/554 |
| 2010/0321479 A1 | * | 12/2010 | Yang | 348/51 |
| 2011/0051002 A1 | * | 3/2011 | Oh | 348/569 |
| 2012/0011535 A1 | * | 1/2012 | Eguchi et al. | 725/25 |

FOREIGN PATENT DOCUMENTS

| | | |
|---|---|---|
| JP | 2008-124670 A | 5/2008 |
| JP | 2009-260949 A | 11/2009 |

* cited by examiner

Primary Examiner — Christopher Shin
(74) Attorney, Agent, or Firm — Lerner, David, Littenberg, Krumholz & Mentlik, LLP

(57) ABSTRACT

There is provided a transmitter device including an interface unit that is an interface for connection to a receiver device via a transmission path, a pre-emphasis unit configured to generate a pre-emphasis signal, the pre-emphasis signal being obtained by adding to an input signal another signal for compensating for a high-frequency component of the input signal, and a transmission control unit configured to acquire identification information indicating whether the receiver device is capable of performing a process of receiving the pre-emphasis signal, switch the receiver device to a state in which the receiver device is capable of performing the process of receiving the pre-emphasis signal in accordance with the identification information, and control the pre-emphasis unit to generate the pre-emphasis signal.

11 Claims, 14 Drawing Sheets

TRANSMITTER DEVICE, RECEIVER DEVICE, TRANSMISSION METHOD, RECEPTION METHOD, AND TRANSMITTER/RECEIVER DEVICE

CROSS-REFERENCE TO RELATED APPLICATION

The present application claims priority from Japanese Patent Application No. JP 2010-119134 filed in the Japanese Patent Office on May 25, 2010, the entire content of which is incorporated herein by reference.

BACKGROUND OF THE INVENTION

1. Field of the Invention

The present invention relates to a transmitter device, a receiver device, transmission method, a reception method, and a transmitter/receiver device.

2. Description of the Related Art

In recent years, a digital interface standard called HDMI (High Definition Multimedia Interface) has emerged for transmission of video signals and audio signals between devices, and has been widely used in the field of household electrical appliances and AV (Audio and Visual) devices. HDMI has been realized by further developing a DVI (Digital Visual Interface) so that video signals, audio signals, and device control signals can be transmitted over a single cable.

By the way, the size of data transmitted between the aforementioned devices has been increasing with the increased screen size of display devices as well as enhanced video quality. Therefore, the HDMI is still demanded to increase the transmission bandwidth. In response thereto, HDMI Ver. 1.3 has defined a gain curve of a cable equalizer for performing an equalization process by estimating a transmission loss which a data signal may undergo on a transmission path and applying high-frequency gain compensation. Compensating for such a transmission loss has doubled the available transmission bandwidth compared to the conventional scheme. JP 2008-124670A discloses a method of performing an equalization process by applying high-frequency gain compensation using a reference clock contained in a transmission path, and further automatically optimizing the process.

SUMMARY OF THE INVENTION

However, as the method disclosed in JP 2008-124670A does not support a bandwidth that is wider than the bandwidth increased with the HDMI Ver. 1.3, a further increase in the available bandwidth is desired. Among methods of further increasing the bandwidth is a method of preventing a transmission loss by adding a signal that compensates for the high-frequency components of a signal to be transmitted which could be easily lost by transmission. However, the method of adding a signal that compensates for the high-frequency components of a signal to be transmitted has a problem in that the compatibility with the conventional signals (hereinafter referred to as normal signals) could be lost.

In light of the foregoing, it is desirable to provide a novel and improved transmitter device, receiver device, transmission method, reception method, and transmitter/receiver device, which can transmit both a pre-emphasis signal, which is obtained by adding to a signal to be transmitted another signal for compensating for the high-frequency components of the signal to be transmitted in advance, and a normal signal, to which such a compensation signal is not added.

According to an embodiment of the present invention, there is provided a transmitter device including an interface unit that is an interface for connection to a receiver device via a transmission path, a pre-emphasis unit configured to generate a pre-emphasis signal, the pre-emphasis signal being obtained by adding to an input signal another signal for compensating for a high-frequency component of the input signal, and a transmission control unit configured to acquire identification information indicating whether the receiver device is capable of performing a process of receiving the pre-emphasis signal, switch the receiver device to a state in which the receiver device is capable of performing the process of receiving the pre-emphasis signal in accordance with the identification information, and control the pre-emphasis unit to generate the pre-emphasis signal.

With the aforementioned configuration, it is possible to generate a pre-emphasis signal and switch the receiver device to a state in which the receiver device is capable of performing a process of receiving the pre-emphasis signal only when the receiver device is compatible with the pre-emphasis transmission. Therefore, transmissions of both a pre-emphasis signal and a normal signal are possible.

The transmission path may be formed of a transmission channel included in a HDMI (High Definition Multimedia Interface) cable.

The identification information may be represented by an identification bit in EDID (Extended Display Identification Data) that is stored in the receiver device.

The transmission control unit may, upon receiving response information corresponding to the control information, cause the pre-emphasis unit to generate the pre-emphasis signal in accordance with the response information.

The transmission control unit may receive the response information via a two-way transmission path.

The transmission control unit may cause each of the control information and the response information to be transmitted or received using a CEC (Consumer Electronics Control) control signal.

The transmission control unit may cause each of the control information and the response information to be transmitted or received using an HEAC (HDMI Ethernet (Registered Trademark) & Audio Return Channel) as the transmission path.

The transmission control unit may cause the control information to be transmitted using an AVI (Auxiliary Video Information) InfoFrame.

The transmission control unit may transmit the control information a plurality of times.

According to another embodiment of the present invention, there is provided a receiver device including a connector unit that is an interface for connection to a transmitter device via a transmission path, a reception processing unit configured to perform a process of receiving a signal from the transmitter device, and a reception control unit configured to, upon receiving from the transmitter device control information for switching the reception processing unit to a state in which the reception processing unit is capable of performing a process of receiving a pre-emphasis signal that is obtained by adding to an input signal another signal for compensating for a high-frequency component of the input signal, switch the reception processing unit to the state in which the reception processing unit is capable of performing the process of receiving the pre-emphasis signal in accordance with the control information.

The reception processing unit may include a de-emphasis unit configured to perform a de-emphasis process in which the high-frequency component, which has been compensated, of the pre-emphasis signal is restored to an initial state, and the reception control unit may switch the de-emphasis unit to a state in which the de-emphasis unit is capable of performing the de-emphasis process to a received signal.

The reception processing unit may further include an equalizer unit configured to compensate for a high-frequency region of the received signal, and the reception control unit may switch between compensation characteristics of the equalizer in accordance with the control information.

According to still another embodiment of the present invention, there is provided a transmission method including a step of acquiring identification information indicating whether a receiver device that is connected to a transmitter device via a transmission path is capable of performing a process of receiving a pre-emphasis signal, the pre-emphasis signal being obtained by adding to an input signal another signal for compensating for a high-frequency component of the input signal, a step of transmitting control information to the receiver device in accordance with the identification information, the control information being for switching the receiver device to a state in which the receiver device is capable of performing the process of receiving the pre-emphasis signal, and a step of transmitting the pre-emphasis signal to the receiver device.

According to yet another embodiment of the present invention, there is provided a reception method including a step of receiving, from a transmitter device connected to a receiver device via a transmission path, control information for switching the receiver device to a state in which the receiver device is capable of performing a process of receiving a pre-emphasis signal, a reception standby step for enabling the receiver device to perform the process of receiving the pre-emphasis signal, and a step of receiving the pre-emphasis signal.

According to further another embodiment of the present invention, there is provided a transmitter/receiver device that includes a transmitter unit including a connector unit that is an interface for connection to a receiver device via a transmission path, a pre-emphasis unit configured to generate a pre-emphasis signal, the pre-emphasis signal being obtained by adding to an input signal another signal for compensating for a high-frequency component of the input signal, and a transmission control unit configured to acquire identification information indicating whether the receiver device is capable of performing a process of receiving the pre-emphasis signal, transmit control information to the receiver device in accordance with the identification information, the control information being for switching the receiver device to a state in which the receiver device is capable of performing the process of receiving the pre-emphasis signal, and control the pre-emphasis unit to generate the pre-emphasis signal; and a receiver unit including a connector unit that is an interface for connection to the transmitter device via the transmission path, a reception processing unit configured to perform a process of receiving a signal from the transmitter device, and a reception control unit configured to, upon receiving from the transmitter device control information for switching the receiver device to a state in which the receiver device is capable of performing a process of receiving a pre-emphasis signal that is obtained by adding to an input signal another signal for compensating for a high-frequency component of the input signal, switch the reception processing unit to the state in which the reception processing unit is capable of performing the process of receiving the pre-emphasis signal in accordance with the control information.

As described above, according to the present invention, it is possible to transmit both a pre-emphasis signal, which is obtained by adding to a signal to be transmitted another signal for compensating for the high-frequency components of the signal to be transmitted in advance, and a normal signal, to which such a compensation signal is not added.

DETAILED DESCRIPTION OF THE EMBODIMENTS

Figure 1:
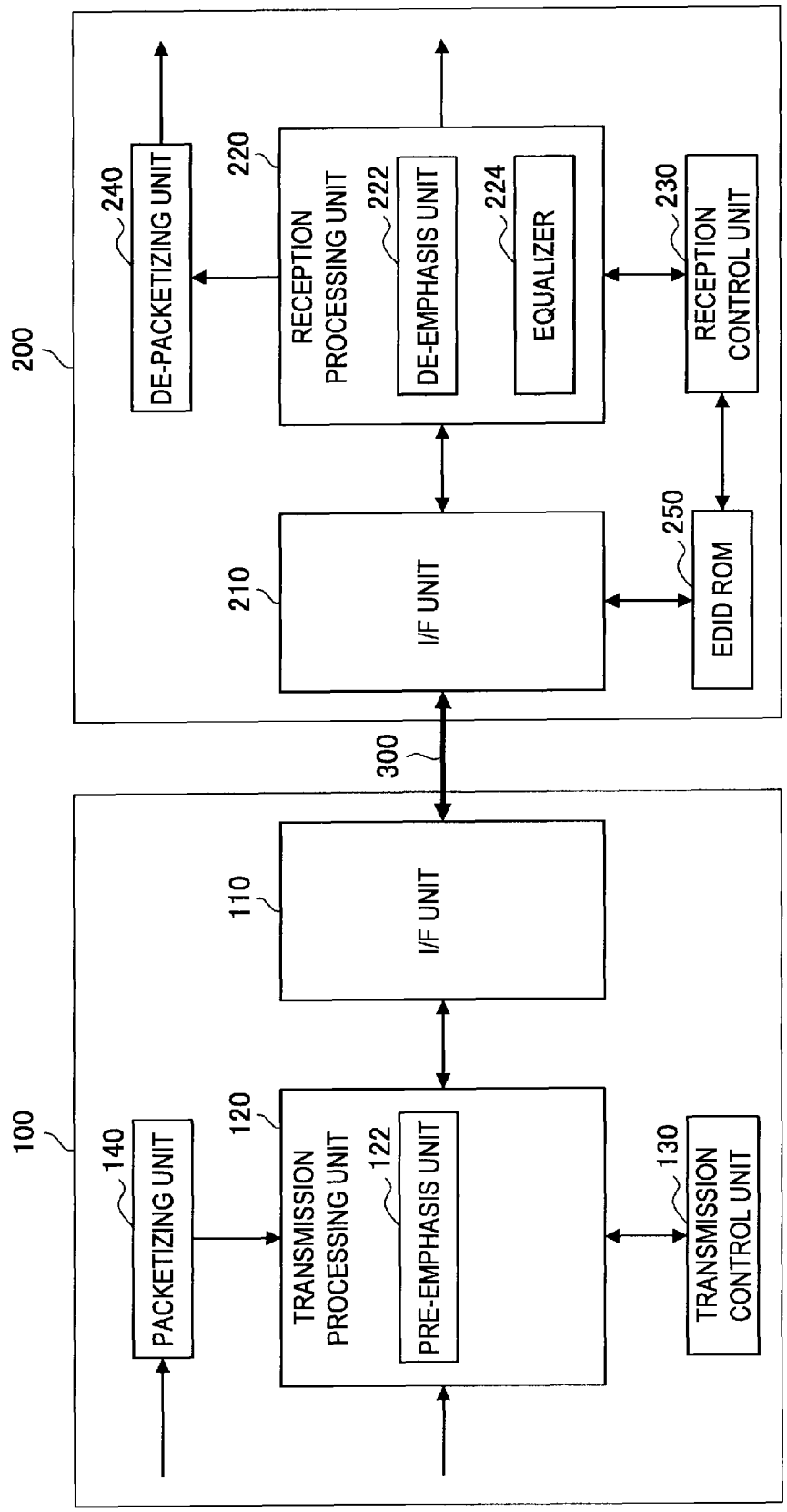
FIG. 1 is a block diagram showing the configuration of a transmission system in accordance with one embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. Outline
2. Functional Configuration
3. Signal Structure
4. Control Information Used for Switching the Operation Mode
   4-1. EDID Information and AVI InfoFrame
   4-2. CEC Control Signal
   4-3. Packets (HEAC) of the Ethernet (Registered Trademark)
5. Cable Structure
6. Examples of Advantageous Effect <1. Outline>

HDMI is a digital interface standard, on the basis of which video signals, audio signals, and device control signals can be transmitted. This HDMI is a standard developed for AV devices and household electrical appliances by adding a function of transmitting audio signals and device control signals as well as a copy-protection function (HDCP: High-bandwidth Digital Content Protection system) on the basis of a connection standard called DVI for connecting a PC (Personal Computer) and a display.

DisplayPort is another example of a digital interface standard for transmitting video signals. While the HDMI prioritizes the compatibility with the DVI and is defined by extending the DVI, the DisplayPort prioritizes the use under high-resolution conditions by ignoring the compatibility with the DVI, thereby realizing a wider bandwidth than that of the HDMI at the present stage.

Herein, the HDMI is also desired to be compatible with a format such as a large-screen format called 2K×4K and a high frame rate (1K×2K, 240 Hz, 8 bits) by further increasing the bandwidth. Among methods of increasing the bandwidth of the HDMI is the application of pre-emphasis. Pre-emphasis refers to a method of emphasizing the edge components of a signal, which could be lost by transmission, in advance.

Figure 13A:
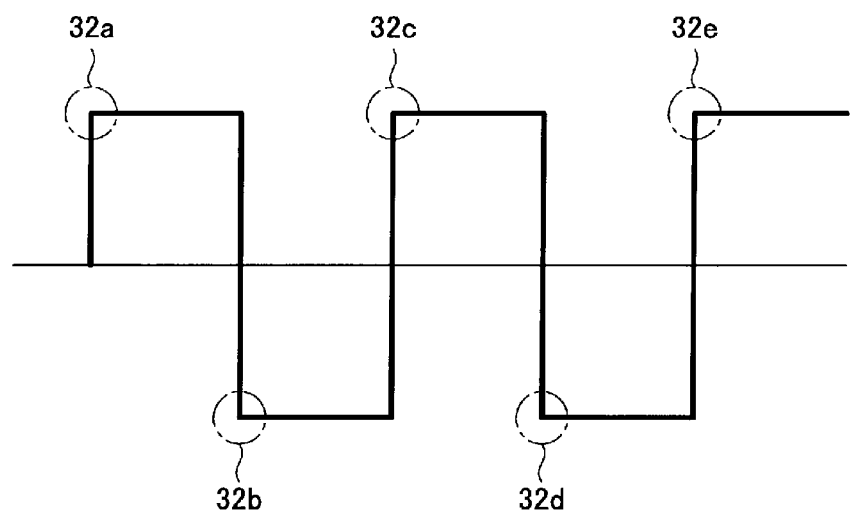
FIGS. 13A and 13B are explanatory diagrams showing a state in which high-frequency components are lost by transmission.
Figure 13B:
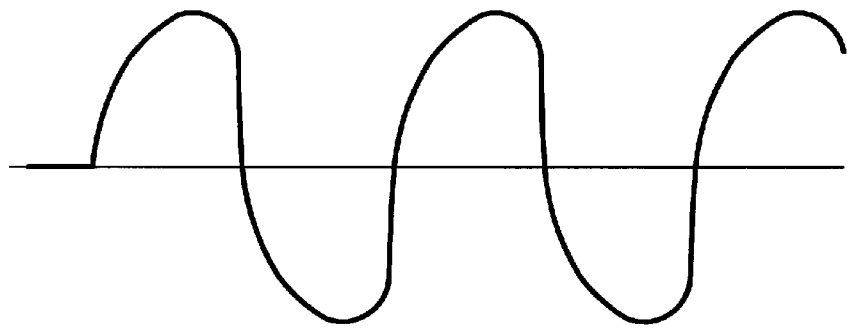
Figure 14A:
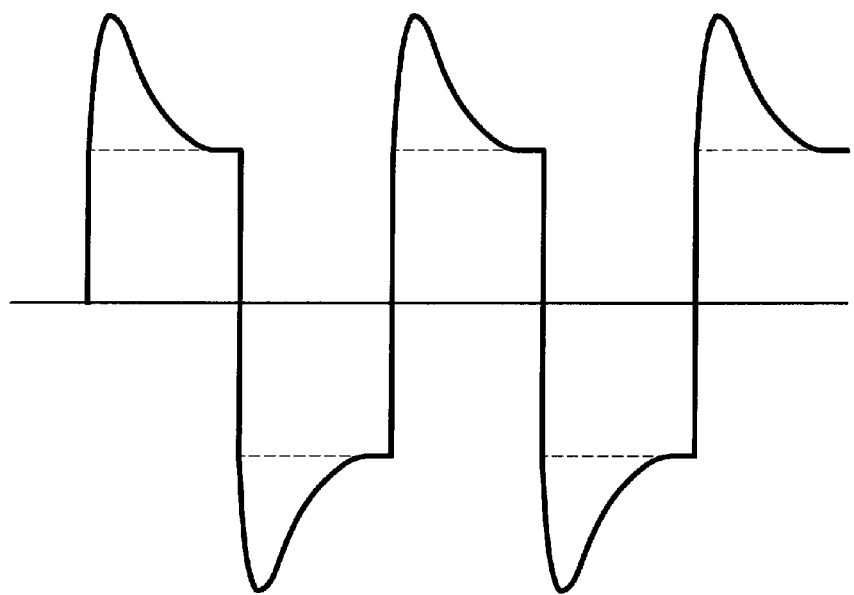
FIGS. 14A and 14B are explanatory diagrams schematically showing a pre-emphasis signal.
Figure 14B:
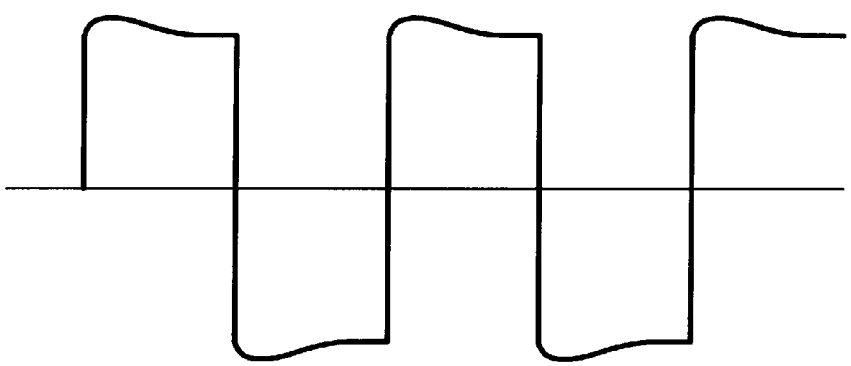

Herein, pre-emphasis will be described with reference to FIGS. 13A, 13B, 14A, and 14B. FIGS. 13A and 13B are explanatory diagrams showing a state in which high-frequency components are lost by transmission. FIGS. 14A and 14B are explanatory diagrams schematically showing a pre-emphasis signal.

As shown in FIG. 13A, the value 0 or 1 of a digital signal is determined from its edge 32 portion. However, as the high-frequency components of a signal can easily deteriorate, the waveform of the digital signal shown in FIG. 13A is blunted as shown in FIG. 13B after transmission.

Therefore, a method called pre-emphasis is known in which the components of the edge 32 portion, which can be easily lost by transmission, are emphasized in advance. For example, blunting of the waveform of the edge 32 portion of a signal, to which pre-emphasis is applied as shown in FIG. 14A, is reduced even after it has deteriorated by transmission.

However, while the DisplayPort has been previously compatible with such pre-emphasis but not compatible with the conventional signals used with the DVI (hereinafter, such signals not subjected to pre-emphasis shall be referred to as normal signals), the HDMI currently performs transmission using normal signals in order to prioritize the compatibility with the DVI. Therefore, if the pre-emphasis function is simply added to the HDMI, compatibility with normal signals would be lost.

Herein, a transmission system in accordance with one embodiment of the present invention is configured such that a pre-emphasis circuit is provided in a transmitter device, a de-emphasis circuit is provided in a receiver device, and ON/OFF of the pre-emphasis circuit and the de-emphasis circuit are switched using a control signal so that both a normal signal and a pre-emphasis signal can be transmitted between the transmitter device and the receiver device. The specific configuration of such a transmission system will be described hereinafter.

<2. Functional Configuration>

FIG. 1 is a block diagram showing the functional configuration of a transmission system in accordance with this embodiment. A transmission system 10 in accordance with this embodiment mainly includes a transmitter device 100, a receiver device 200, and an HDMI 300 cable that connects the transmitter device 10 and the receiver device 200.

The transmitter device 100 is a device typically called a "source device" in the HDMI. The transmitter device 100 transmits data such as video and audio to the receiver device 200. Specific examples of the transmitter device 100 include game machines, DVD players, set-top boxes, and other AV source devices.

The receiver device 200 is a device typically called a "sync device" in the HDMI. Specific examples of the receiver device 200 include television receivers, projectors, and other display devices.

The HDMI cable 300 is a cable defined by the HDMI, and connects the transmitter device 100 and the receiver device 200. The details of the HDMI cable will be described later in conjunction with a signal structure. The HDMI cable mainly transmits video signals, audio signals, and control signals between the transmitter device 100 and the receiver device 200.

(Transmitter Device 100)

The transmitter device 100 mainly includes an interface unit 110, a transmission processing unit 120, a transmission control unit 130, and a packetizing unit 140. Note that a combination of the transmission processing unit 120 and the packetizing unit 140 is also called an encoder unit.

The interface unit 110 is an interface for connection to the HDMI cable 300, and has a configuration defined by the HDMI.

The transmission processing unit 120 is also called an HDMI transmitter, and performs signal processing for transmitting input video signals, audio signals, and control signals to TMDS channels of the HDMI cable. Examples of such signal processing include an encoding process and a pre-emphasis process. A functional unit that performs such a pre-emphasis process is referred to as a pre-emphasis unit 122. The transmission processing unit 120 operates under the control of the transmission control unit 130.

The pre-emphasis unit 122 has a function of generating a pre-emphasis signal such as the one described with reference to FIGS. 14A and 14B. That is, the pre-emphasis unit generates a pre-emphasis signal obtained by adding to an input signal another signal for compensating for the high-frequency components of the input signal. The pre-emphasis unit 122 is implemented with a circuit or the like that performs a pre-emphasis process. This pre-emphasis unit 122 operates under the control of the transmission control unit 130. Specifically, the pre-emphasis unit 122 has a pre-emphasis mode in which a pre-emphasis process is performed and a normal mode in which the pre-emphasis process is not performed. Such operation mode is switched under the control of the transmission control unit 130.

The transmission control unit 130 has a function of controlling the transmission operation of the transmitter device 100. The transmission control unit 130 acquires identification information indicating whether the receiver device 200 is capable of performing a process of receiving a pre-emphasis signal, for example, and controls the transmission operation in accordance with the identification information. Specifically, the transmission control unit 130, upon acquiring identification information indicating that the receiver device 200 is capable of performing a process of receiving a pre-emphasis signal, controls the receiver device 200 to operate in the de-emphasis mode in which the receiver device 200 can receive a pre-emphasis signal, and further controls the transmitter device 100 to operate in the pre-emphasis mode in which a pre-emphasis signal is used.

Specific operations in the pre-emphasis mode and the de-emphasis mode differ depending on the type and the like of the control information used for switching the operation mode. Therefore, such specific operations will be described later for each type of the control information.

Meanwhile, if the transmission control unit 130 has acquired identification information indicating that the receiver device 200 is not capable of performing a process of receiving a pre-emphasis signal, the transmission control unit 130 controls each of the transmitter device 100 and the receiver device 200 to operate in the normal mode in which a normal signal without pre-emphasis applied thereto is transmitted between the transmitter device 100 and the receiver device 200.

The packetizing unit 140 has a function of packetizing an audio signal and a control signal. The packetizing unit 140, upon packetizing an input audio signal and control signal, inputs the signals to the transmission processing unit 120.
(Receiver Device 200)

The receiver device 200 mainly includes an interface unit 210, a reception processing unit 220, a reception control unit 230, a de-packetizing unit 240, and EDID ROM 205. Note that a combination of the reception processing unit 220 and the de-packetizing unit 240 is also called a decoder unit.

The interface unit 210 is an interface for connection to the HDMI cable 300, and has a configuration defined by the HDMI.

The reception processing unit 220 is also called an HDMI receiver, and performs a process of receiving a received signal. Examples of such reception processing include a decoding process, a de-emphasis process, and an equalization process. A functional unit, which performs a de-emphasis process by restoring the compensated high-frequency components of a pre-emphasis signal to the initial state, is referred to as a de-emphasis unit 222, while a functional unit, which performs an equalization process by estimating a transmission loss of a received signal and applying high-frequency gain compensation, is referred to as an equalizer 224. The reception processing unit 220 operates under the control of the reception control unit 230.

The reception control unit 230 has a function of controlling the reception operation of the receiver device 200. The reception control unit 230, upon receiving from the transmitter device 100 control information for switching the receiver device 200 to the de-emphasis mode in which a process of receiving a pre-emphasis signal can be performed, switches the operation mode of the receiver device 200 to the de-emphasis mode. The de-emphasis mode herein specifically refers to an operation mode in which the de-emphasis unit 222 of the reception processing unit 220 performs a de-emphasis process to a received signal and the equalizer 224 performs an equalization process thereto using an equalizer curve with the compensation characteristics corresponding to the pre-emphasis signal.

Figure 2:
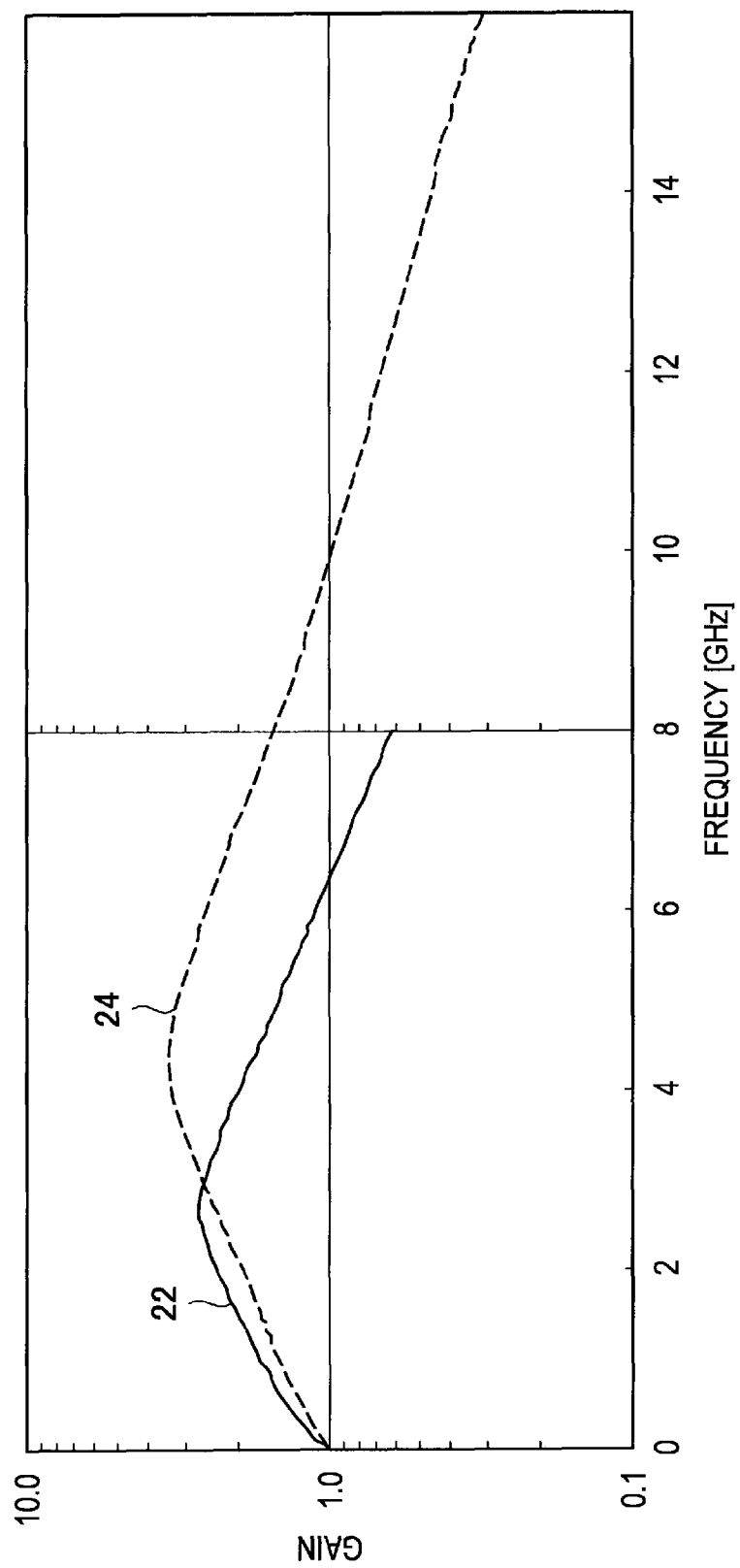
FIG. 2 is an exemplary equalizer curve used in a receiver device in accordance with the embodiment.
Figure 3:
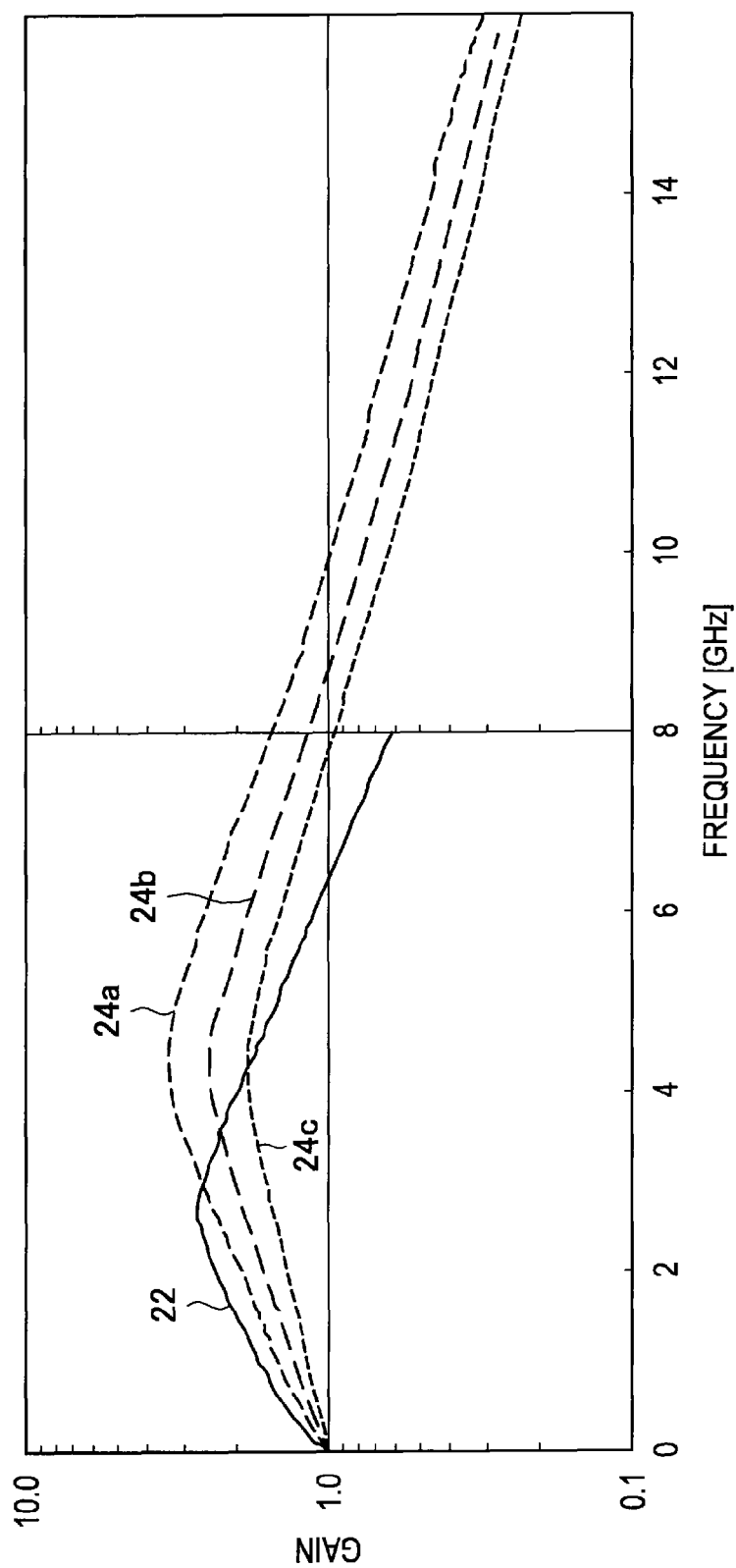
FIG. 3 is another exemplary equalizer curve used in the receiver device in accordance with the embodiment.

Herein, examples of the equalizer curve used by the equalizer 224 will be described with reference to FIGS. 2 and 3. FIG. 2 shows an equalizer curve 22 corresponding to a normal signal and an equalizer curve 24 corresponding to a pre-emphasis signal. The HDMI Ver. 1.3 has defined the gain characteristics of a cable equalizer, which compensates for a transmission path loss, as shown by the equalizer curve 22 so as to allow for a clock rate of 340 MHz (a data rate of 3.4 Gbit/s).

In this embodiment, the bandwidth of a transmission path is further increased by adopting pre-emphasis transmission. To this end, the gain characteristics of a cable equalizer are newly defined as shown by the equalizer curve 24 so as to allow for a clock rate of 680 Gbit/s (a data rate of 6.8 Gbit/s). The gain characteristics of the equalizer 224 are switched in accordance with the operation mode, namely, in accordance with the control of the reception control unit 230. With such a configuration, it is possible to adequately compensate for a transmission path loss in accordance with the gain characteristics corresponding to a normal signal or a pre-emphasis signal that is received.

By the way, a transmission loss of a signal is influenced by the length, quality, and the like of a cable that is used for transmission. Therefore, the gain characteristics of the equalizer 224 may be automatically switched in accordance with the quality of a transmitted clock signal. For example, the equalizer 224 may switch among three equalizer curves 24 including equalizer curves 24a, 24b, and 24c such as those shown in FIG. 3 corresponding to a pre-emphasis signal.

Needless to say, the equalizer curves shown herein are only exemplary. That is, although the equalizer 224 herein is adapted to switch among the three equalizer curves corresponding to a pre-emphasis signal, the present invention is not limited thereto. For example, more equalizer curves may be prepared so that the equalizer 224 may select one of them. Further, although only a single equalizer curve 22 corresponding to a normal signal is shown in FIG. 3, the present invention is not limited thereto. That is, more than one equalizer curve 22 corresponding to a normal signal may be prepared.

Referring again to FIG. 1, the configuration of the receiver device 200 is described now. The de-packetizing unit 240 has a function of restoring a signal, which has been packetized by the packetizing unit 140 in the transmitter device 100, to the initial state. The de-packetizing unit 240 performs a process of de-packetizing the packet received from the reception processing unit 220.

The EDID ROM 250 is a storage unit for storing EDID (Extended Display Identification Data) information. EDID information is information indicating the performance of the receiver device 200, which is a synch device of the HDMI, as a display device. Examples of such information indicating the performance of a display device include information on the resolution and bandwidth. The transmitter device 100 can transmit a signal in a format that matches the display performance of the receiver device by acquiring the EDID information.

Described above is the basic configuration of the transmission system 10 in accordance with this embodiment. The transmission system 10 first checks that both the transmitter device 100 and the receiver device 200 are compatible with the transmission of a pre-emphasis signal by transmitting control information between the transmitter device 100 and the receiver device 200, and switches the transmitter device 100 to the pre-emphasis mode and switches the receiver device 200 to the de-emphasis mode, and then performs transmission using a pre-emphasis signal. The transmission system 10 uses control information or identification information to check if the transmitter device 100 and the receiver device 200 are compatible with the transmission of a pre-emphasis signal and to switch their operation modes. A plurality of methods is considered as the methods for transmitting the control information and identification information used herein. Hereinafter, the signal structure of the HDMI will be described for understanding the difference among the methods for transmitting the control information and identification information.

<3. Signal Structure>

Figure 4:
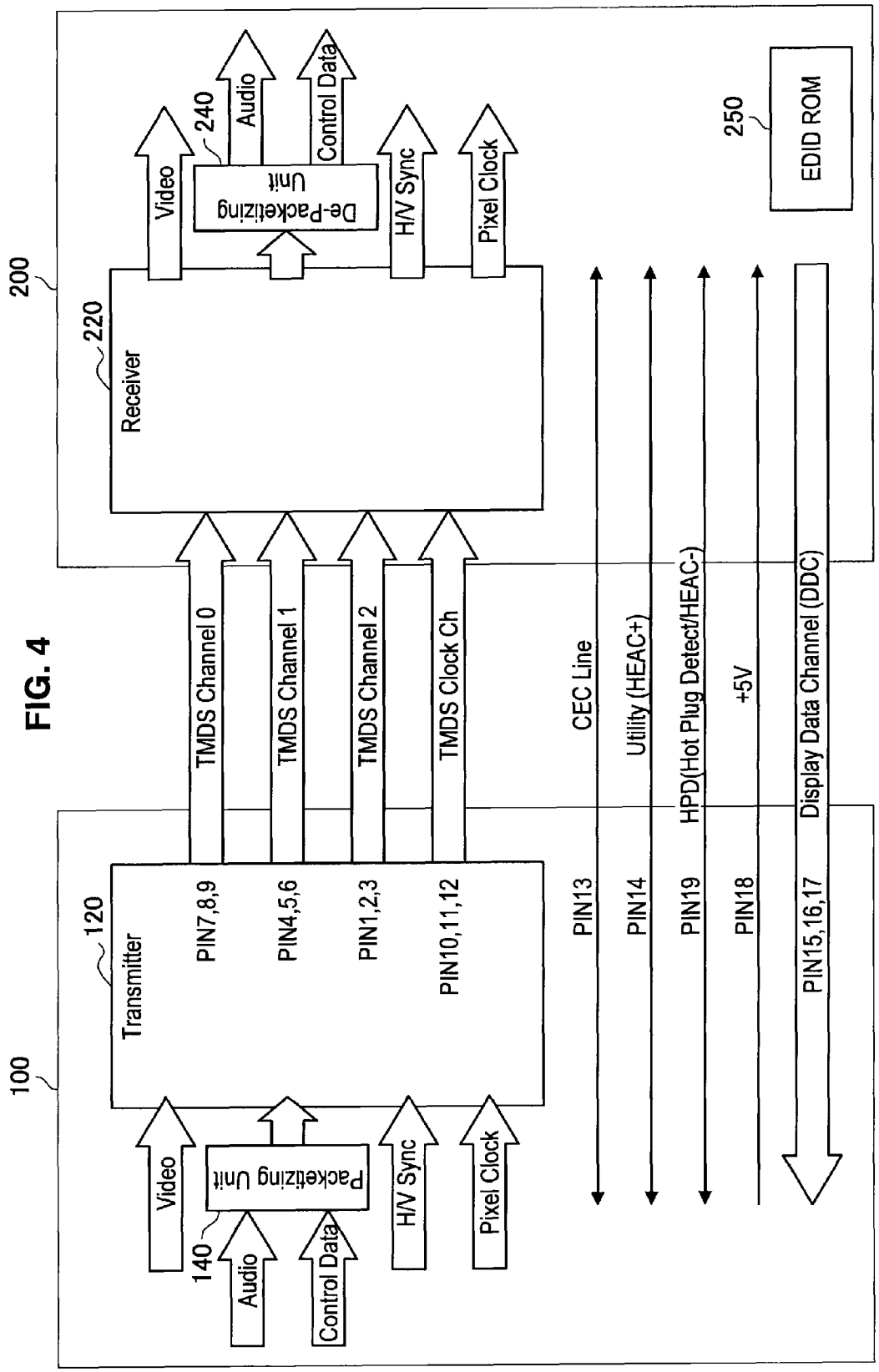
FIG. 4 is an explanatory diagram schematically showing the signal structure of the HDMI.

FIG. 4 is an explanatory diagram schematically showing the signal structure of the HDMI. As shown in FIG. 4, HDMI cables include three TMDS (Transition Minimized Differential Signaling) channels for transmitting video signals and audio signals between the HDMI transmitter 120 and the HDMI receiver 220, and a single TMDS clock channel. In addition, the following are also included as the main control channels: a CEC (Consumer Electronics Control) line, a utility line, an HPD (Hot Plug Detect) line, a power line (+5 V), and a DDC (Display Data Channel) line.

For the TMDS, a total of four channels are used, which include three channels for respectively transmitting three video signals (primary color signals of R (Red), G (Green), and B (Blue); or color difference signals of Y (luminance), Pb (color difference), and Pr (color difference)), and a single channel for transmitting clock signals. Such four channels are collectively referred to as a "link." A single channel transmits a signal by the differential drive of two signal lines.

The CEC line transmits a CEC control signal for device control. The CEC line allows two-way communication. Specific examples of device control that are realized by using such a CEC control signal include the following control: "just pressing a TV record button can turn on the power of a recorder, tune the recorder to a channel being viewed on the TV, and start recording."

The HPD line transmits an HPD signal for detecting if the transmitter device 100 and the receiver device 200 have been successfully connected over a cable. Typically, the source device reads EDID information after detecting that the cable and the sync device have been successfully connected on the basis of a signal returned from the synch device to the source device via a resistor in response to a power of +5 V supplied to the synch device from the source device.

The utility line and the HPD line are also used as an HEAC+ line and an HEAC− line, respectively, for two-way communication of packets of the Ethernet (Registered Trademark) through a HEAC.

The power line (+5 V) supplies a power of +5 V from the source device to the synch device via the HDMI cable. The power line supplies the power to the EDID ROM in the synch device.

The DDC line is used to read the EDID information written in the EDID ROM in the synch device and to authenticate HDCP.

In a first embodiment of the three embodiments of the transmission system 10 described below, control information is transmitted by means of AVI InfoFrame transmitted through a TMDS channel. At this time, the transmitter device 100 determines if the receiver device 200 is compatible with the pre-emphasis transmission on the basis of the EDID information acquired via the DDC line.

As the acquisition of the EDID information and transmission of the AVI InfoFrame are currently conducted, the first embodiment is advantageous in that it is easy to implement. However, the DDC line and the TMDS line, which are respectively used to acquire the EDID information and transmit the AVI InfoFrame, are only capable of one-way transmission. Therefore, even if control information is transmitted to the receiver device 200 to switch it to the de-emphasis mode corresponding to the pre-emphasis transmission, it would be impossible to check if the operation mode has actually been switched. Therefore, a second embodiment and a third embodiment have been conceived in which the fact that the operation mode has actually been switched is checked using two-way communication.

In the second embodiment, switching of the operation mode and checking of if the operation mode has actually been switched are carried out by defining a new CEC control command using the aforementioned CEC control signal. In the third embodiment, such switching and checking are controlled using packets of the Ethernet (Registered Trademark) through the aforementioned HEAC. Operations in accordance with the three embodiments will be described hereinafter.

<4. Control Information Used for Switching the Operation Mode>

As described above, the transmission system 10 in accordance with this embodiment can transmit both a normal signal and a pre-emphasis signal. In order to transmit both a normal signal and a pre-emphasis signal, the transmitter device 100 should be configured such that its operation mode can switch between the normal mode and the pre-emphasis mode, while the receiver device 200 should be configured such that its operation mode can switch between the normal mode and the de-emphasis mode. The transmission control unit 130 and the reception control unit 230 mutually check if the transmitter device 100 and the receiver device 200 are compatible with the pre-emphasis transmission and switch their operation modes by transmitting/receiving control information.

Several methods are considered as the methods for transmitting the control information used for checking and switching the operation mode. Thus, three specific examples of the methods for transmitting the control information will be described next.

(4-1. EDID Information and AVI InfoFrame)

In the first embodiment, if the receiver device 200 is compatible with the pre-emphasis transmission is checked using the EDID information, and then the transmitter device 100 transmits control information with the AVI InfoFrame to the receiver device 200 to switch the receiver device 200 to the de-emphasis mode corresponding to the pre-emphasis transmission.

Therefore, the receiver device 200 that is compatible with the pre-emphasis transmission has a pre-emphasis bit, which is identification information indicating that the receiver device 200 is compatible with the pre-emphasis transmission, within the EDID information. For the pre-emphasis bit, bit 1 or bit 2 (reserved bit) in byte 6 of the VSDB of the EDID is used, for example.

The transmission control unit 130, upon acquiring the EDID information, checks the pre-emphasis bit in the EDID information. If the pre-emphasis bit is a value indicating that the receiver device 200 is compatible with the pre-emphasis transmission, the transmission control unit 130 controls the transmitter device 100 to operate in the pre-emphasis mode.

In addition, the transmission control unit 130, upon checking that the receiver device 200 is compatible with the pre-emphasis transmission, sends information to the effect that pre-emphasis transmission is about to begin, and transmits control information to the receiver device 200 to switch it to the de-emphasis mode. At this time, the control information is transmitted using the AVI InfoFrame. This control information is transmitted using, for example, bit 7 (reserved bit) in data byte 1 of the VSDB of the AVI InfoFrame.

The reception control unit 230, upon receiving the AVI InfoFrame, checks the control information. If the reception control unit 230 has recognized that the transmitter device 100 is about to begin pre-emphasis transmission, the reception control unit 230 switches the operation mode of the receiver device 200 to the de-emphasis mode. In this embodiment, it is impossible for the transmitter device 100 to check if the receiver device 200 has actually been switched to the de-emphasis mode as described above. Therefore, in order to perform communication more surely, the transmission control unit 130 may transmit control information a plurality of times by transmitting AVI InfoFrame a plurality of times.

Figure 5:
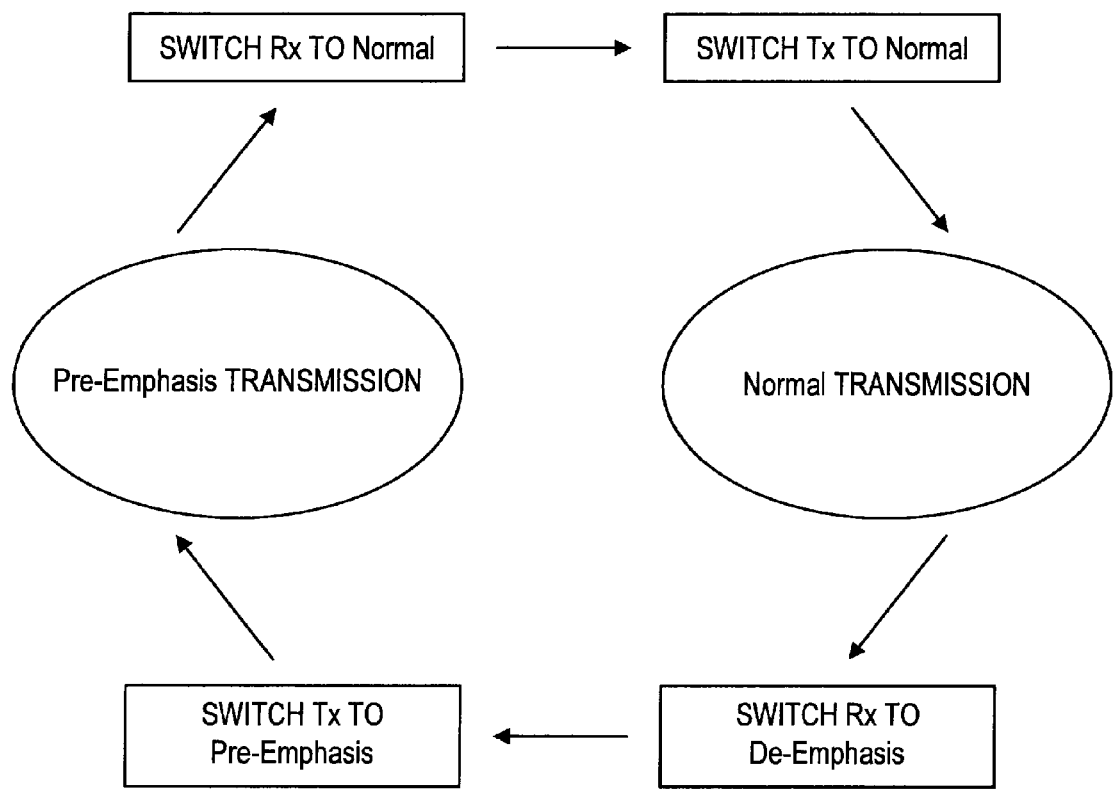
FIG. 5 is an explanatory diagram illustrating a limitation on the timing for switching the operation mode.

Since it is impossible to check if the operation mode of the receiver device 200 has actually been switched, there is a limitation on the timing for switching the operation mode in this embodiment. FIG. 5 is an explanatory diagram illustrating a limitation on the timing for switching the operation mode in the first embodiment.

As shown in FIG. 5, transition of the operation mode should be carried out in such a way that after the control information for switching the operation mode of the receiver device 200 (Rx) is transmitted, the operation mode of the transmitter device 100 (Tx) is switched so that data transmission is started with the switched operation mode.

Figure 6:
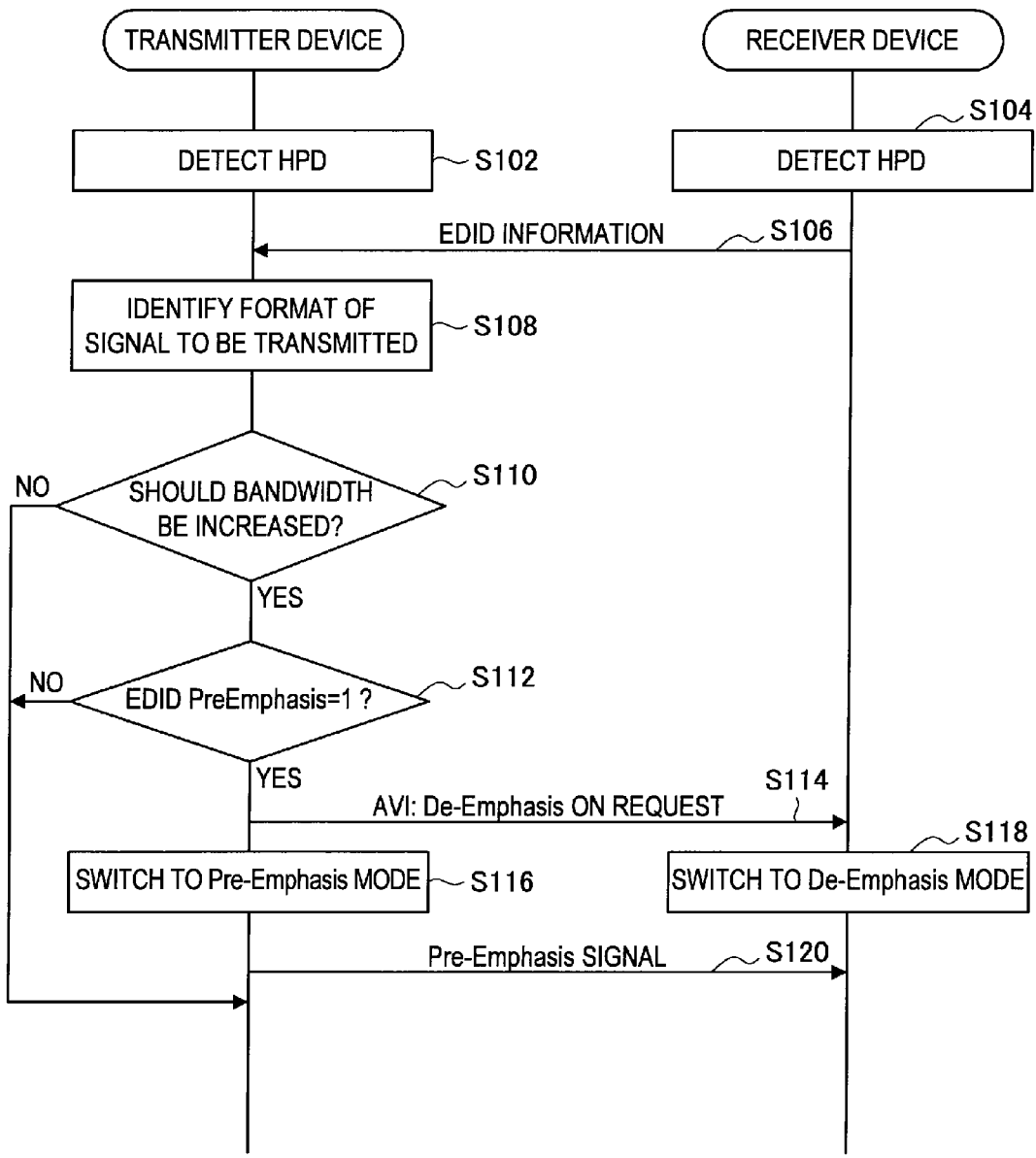
FIG. 6 is a sequence diagram showing a first example of the operation of switching the operation mode.
Figure 7:
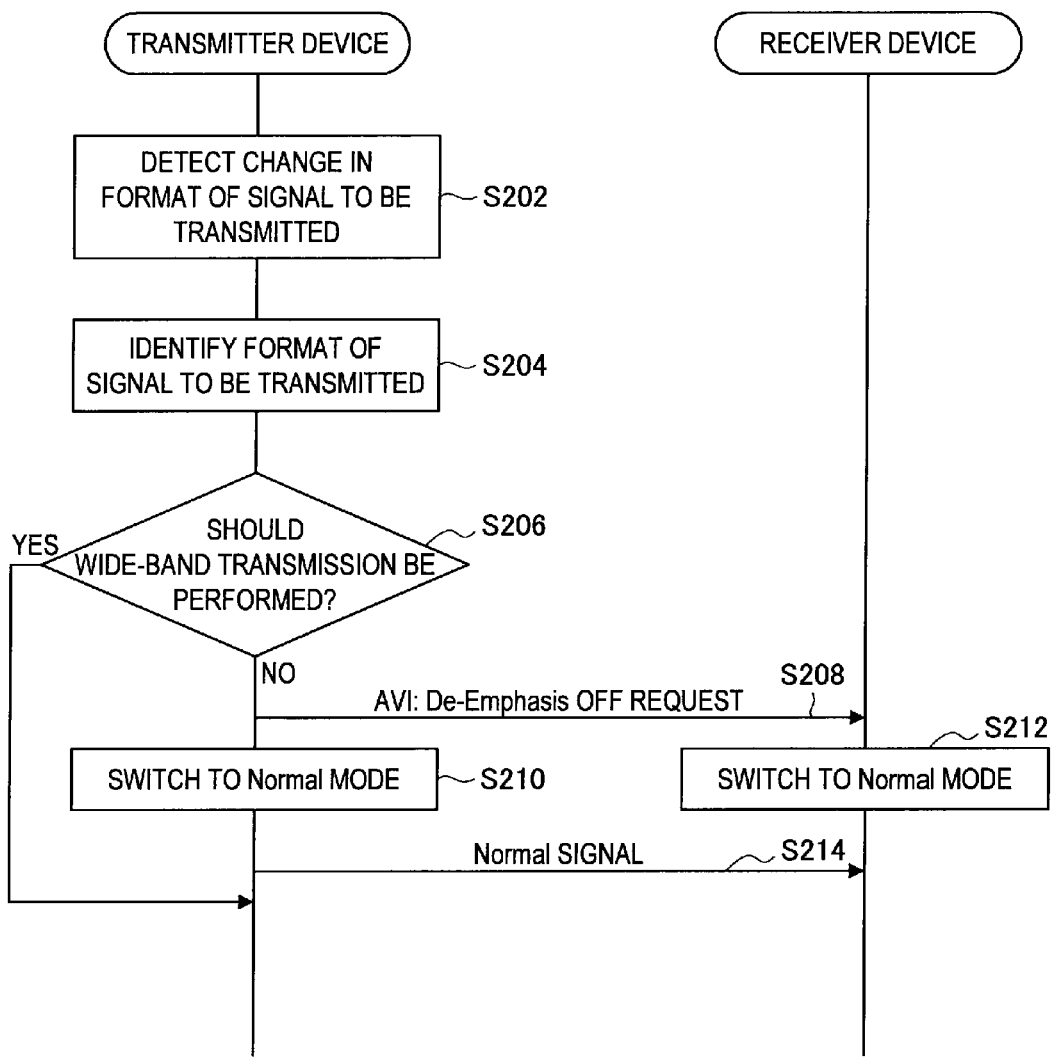
FIG. 7 is a sequence diagram showing a first example of the operation of switching the operation mode from a pre-emphasis mode.

Next, switching of the operation mode in accordance with the first embodiment will be described with reference to FIGS. 6 and 7. FIG. 6 is a sequence diagram showing a first example of the operation of switching the operation mode. FIG. 7 is a sequence diagram showing a first example of the operation of switching the operation mode from the pre-emphasis mode.

First, when the transmitter device 100 and the receiver device 200 are connected via a cable (S104), the transmitter device 100 supplies power to the EDID-ROM in the receiver device 200, and then, the receiver device 200 returns an HPD signal, whereby the transmitter device 100 detects the HPD (S102). Then, the receiver device 200 transmits EDID information to the transmitter device 100 (S106). In addition, the transmission control unit 130 checks the format of a signal to be transmitted (S108). Then, the transmission control unit 130 determines if the bandwidth should be increased on the basis of the format of the signal to be transmitted that has been checked in step S108 (S110).

If it is determined that the bandwidth need not be increased, the transmitter device 100 and the receiver device 200 keep operating in the normal mode. Thus, the operation of switching the operation mode terminates. Meanwhile, if it is determined that the bandwidth should be increased, the value of a pre-emphasis bit in the EDID information, which has been acquired in step S106, is checked (S112). Then, if the value of the pre-emphasis bit is 1 (which is a value indicating that the receiver device 200 is compatible with the pre-emphasis transmission), the transmission control unit 130 transmits control information with the AVI InfoFrame, requesting that the receiver device 200 be switched to the de-emphasis mode (S114).

Meanwhile, if the value of the pre-emphasis bit is not determined to be 1 in step S112, that is, if the receiver device 200 is not compatible with the pre-emphasis transmission, the transmission control unit 130 does not switch the operation mode as it is impossible to perform pre-emphasis transmission.

In step S114, the transmission control unit 130, upon transmitting the control information for switching the receiver device 200 to the de-emphasis mode, switches the transmission processing unit 120 to the pre-emphasis mode. Specifically, the transmission control unit 130 controls the pre-emphasis unit 122 in the transmission processing unit 120 to perform a pre-emphasis process and thus to generate a pre-emphasis signal.

Meanwhile, the reception control unit 230 in the receiver device 200, which has received the AVI InfoFrame transmitted in step S114, switches the reception processing unit 220 to the de-emphasis mode in accordance with the control information, which is included in the AVI Infoframe, for switching the receiver device 200 to the de-emphasis mode (S118).

Then, the transmission control unit 130 starts transmission of a pre-emphasis signal to the receiver device 200 (S120). Herein, as the transmission control unit 130 should start transmission of a pre-emphasis signal after the receiver device 200 has been switched to the de-emphasis mode, the operation mode of the transmission processing unit 130 may be switched after the control information is transmitted a plurality of times.

Alternatively, if the format of a signal to be transmitted is changed while the transmitter device 100 operates in the pre-emphasis mode and the receiver device 200 operates in the de-emphasis mode, the operation mode may be switched to the normal mode as needed.

First, when the transmission control unit 130 detects a change in the format of a signal to be transmitted (S202), it checks the format of the signal to be transmitted (S204). Then, the transmission control unit 130, on the basis of the identified format of the signal to be transmitted, determines if wide-band transmission should be performed (S206). If it is determined that wide-band transmission should be performed in step S206, transmission is desirably performed still in the pre-emphasis mode. Thus, the transmission control unit 130 does not switch the operation mode.

Meanwhile, if it is determined that wide-band transmission need not be performed in step S206, the transmission control unit 130 performs control so that transmission is performed in the normal mode. That is, the transmission control unit 130 transmits to the receiver device 200 control information for switching the receiver device 200 to the normal mode using the AVI InfoFrame (S208).

Upon transmitting the control information to the receiver device 200 in step S208, the transmission control unit 130 switches the transmission processing unit 120 to the normal mode (S210). Meanwhile, the reception control unit 230 that has received the control information from the transmitter device 100 switches the operation mode of the reception processing unit 220 to the normal mode in accordance with the control information received (S212). Then, the transmission control unit 130 starts transmission of a normal signal to the receiver device 200 (S214).

Note that in this embodiment, the operation mode is switched to the normal mode if a bandwidth, which is as wide as the bandwidth for transmitting a pre-emphasis signal, is not needed. However, the present invention is not limited thereto. If both the transmitter device 100 and the receiver device 200 are compatible with the pre-emphasis transmission, pre-emphasis transmission may be performed. In such a case, a switch operation such as the one shown in FIG. 7 is not needed.

(4-2. CEC Control Signal)

Next, the second embodiment in which a CEC control signal is used will be described with reference to FIGS. 8 and 9. As described above, as the CEC line allows two-way communication, the transmitter device 100 can, after having transmitted a control signal for switching the operation mode of the receiver device 200, receive response information from the receiver device 200. The reception control unit 230, upon switching the operation mode of the receiver device 200 to the de-emphasis mode, transmits the response information to the transmitter device 100 via the CEC line. Then, the transmission control unit 130, upon checking the response information, switches the operation mode of the transmitter device 100.

Figure 8:
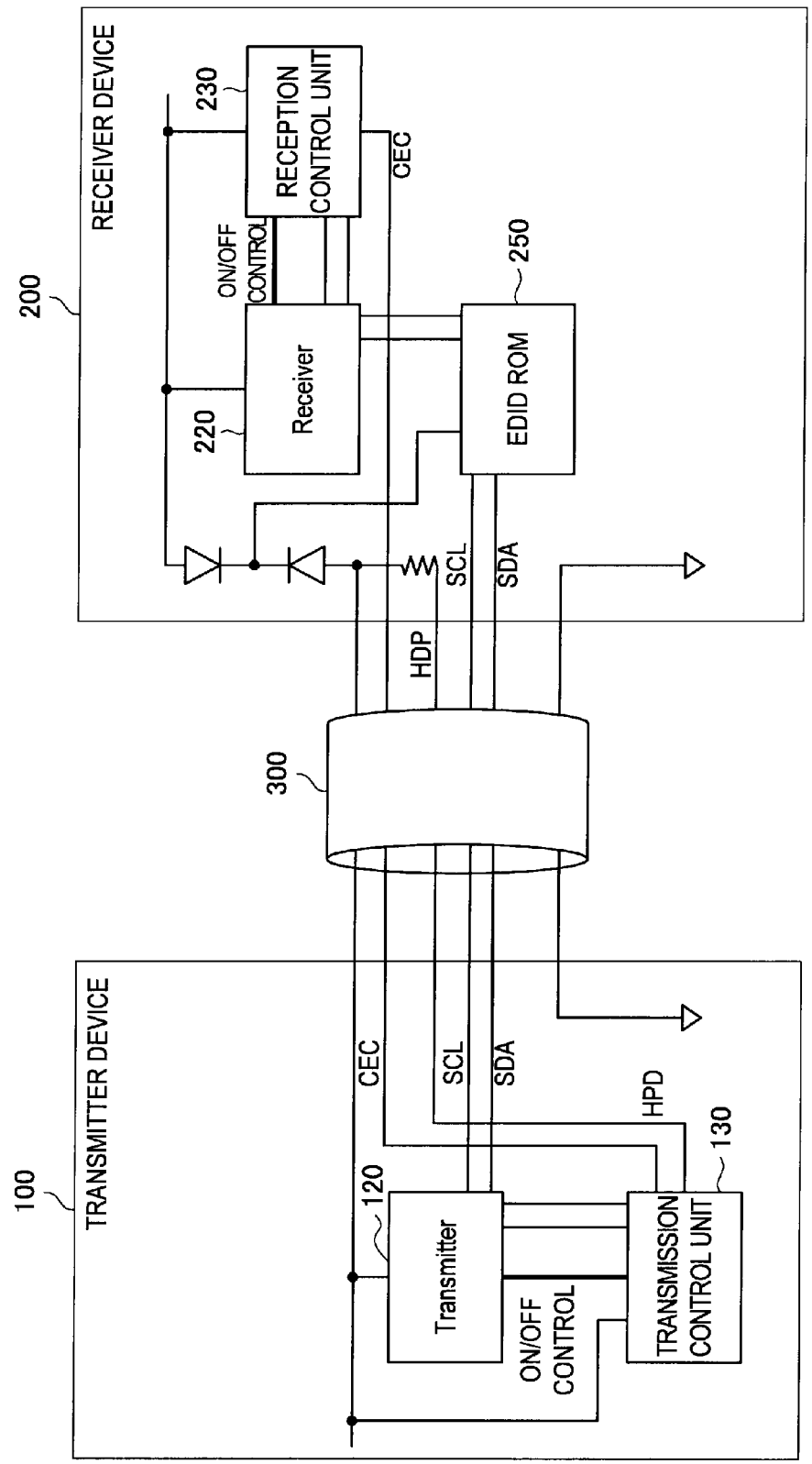
FIG. 8 is an explanatory diagram showing the mechanism of a CEC.

As shown in FIG. 8, the transmitter device 100 and the receiver device 200 can mutually transmit CEC control signals via the CEC line. As the CEC line allows two-way communication, the receiver device 200 can return response information corresponding to the control information to the transmitter device 100. Then, the transmission control unit 130 controls the transmission processing unit 120 in accordance with the response information.

Figure 9:
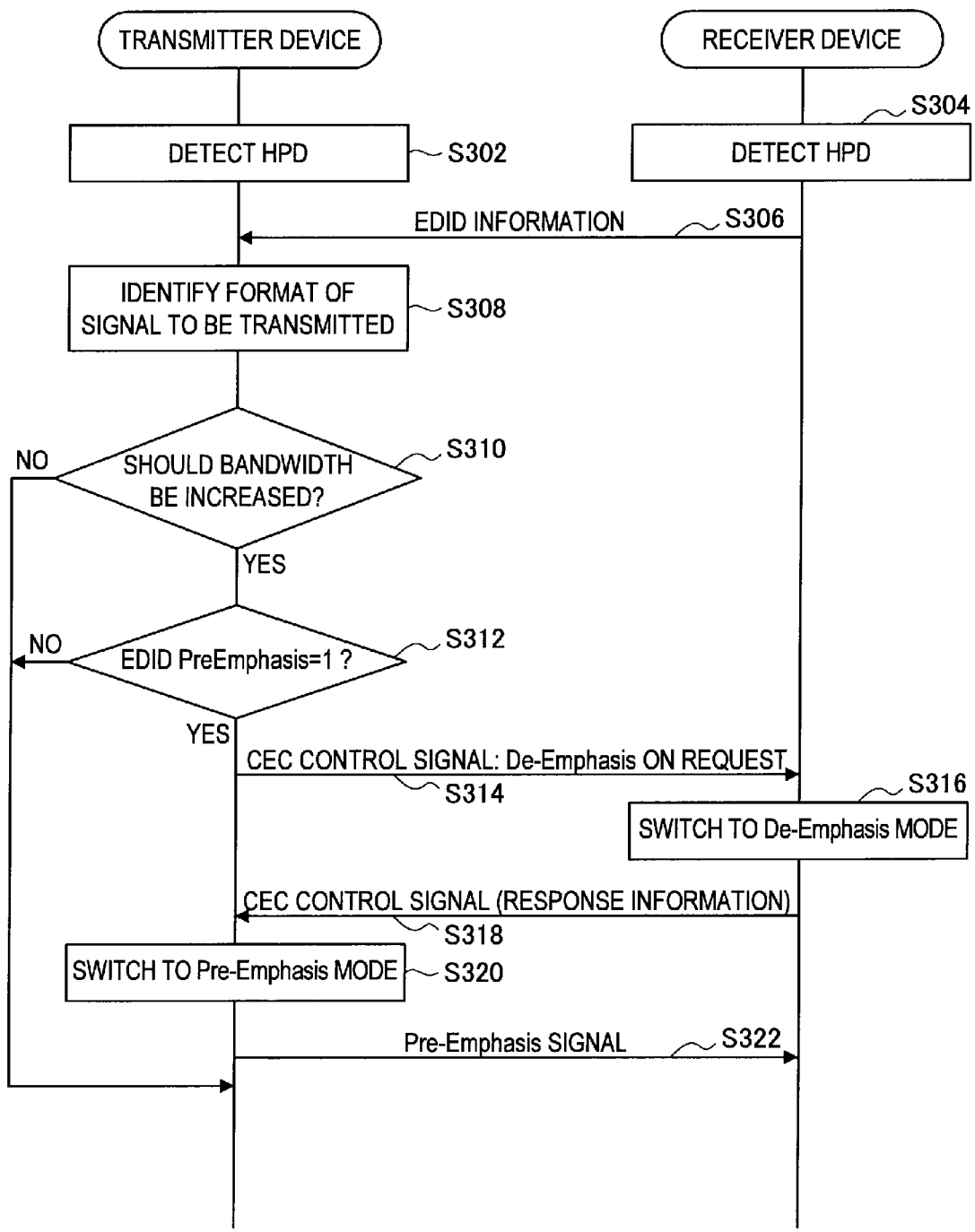
FIG. 9 is a sequence diagram showing a second example of the operation of switching the operation mode.

Next, FIG. 9 is a sequence diagram showing the operation of the second embodiment. The operations of step S302 to step S312 are the same as those of step S102 to step S112 in FIG. 6. Thus, description thereof is omitted herein.

If the value of a pre-emphasis bit in the EDID is determined to be 1 in step S312, the transmission control unit 130 transmits to the receiver device 200 control information for switching the receiver device 200 to the de-emphasis mode using a CEC control signal (S314). The reception control unit 230 in the receiver device 200, upon receiving such control information, switches the operation mode to the de-emphasis mode in accordance with the control information (S316), and then returns the response information to the transmitter device 100 using a CEC control signal (S318).

From such response information, the transmitter device 100 can determine that the receiver device 200 has been switched to the de-emphasis mode. Therefore, the transmission control unit 130 switches the operation mode of the transmitter device 100 to the pre-emphasis mode in accordance with the response information (S320). Then, the transmission control unit 130 starts transmission of a pre-emphasis signal (S322).

Hereinabove, description has been made of the method for transmitting both the control information and response information for switching the operation mode using CEC control signals. However, the present invention is not limited thereto. For example, the control information for switching the operation mode may be transmitted using the AVI InfoFrame, while the response information corresponding to such control information may be transmitted using a CEC control signal.

As the use of the CEC line allows two-way communication, it is possible to start pre-emphasis transmission after the operation mode of the receiver device 200 has been surely switched.

(4-3. Packets of the Ethernet (Registered Trademark): HEAC)

Figure 10:
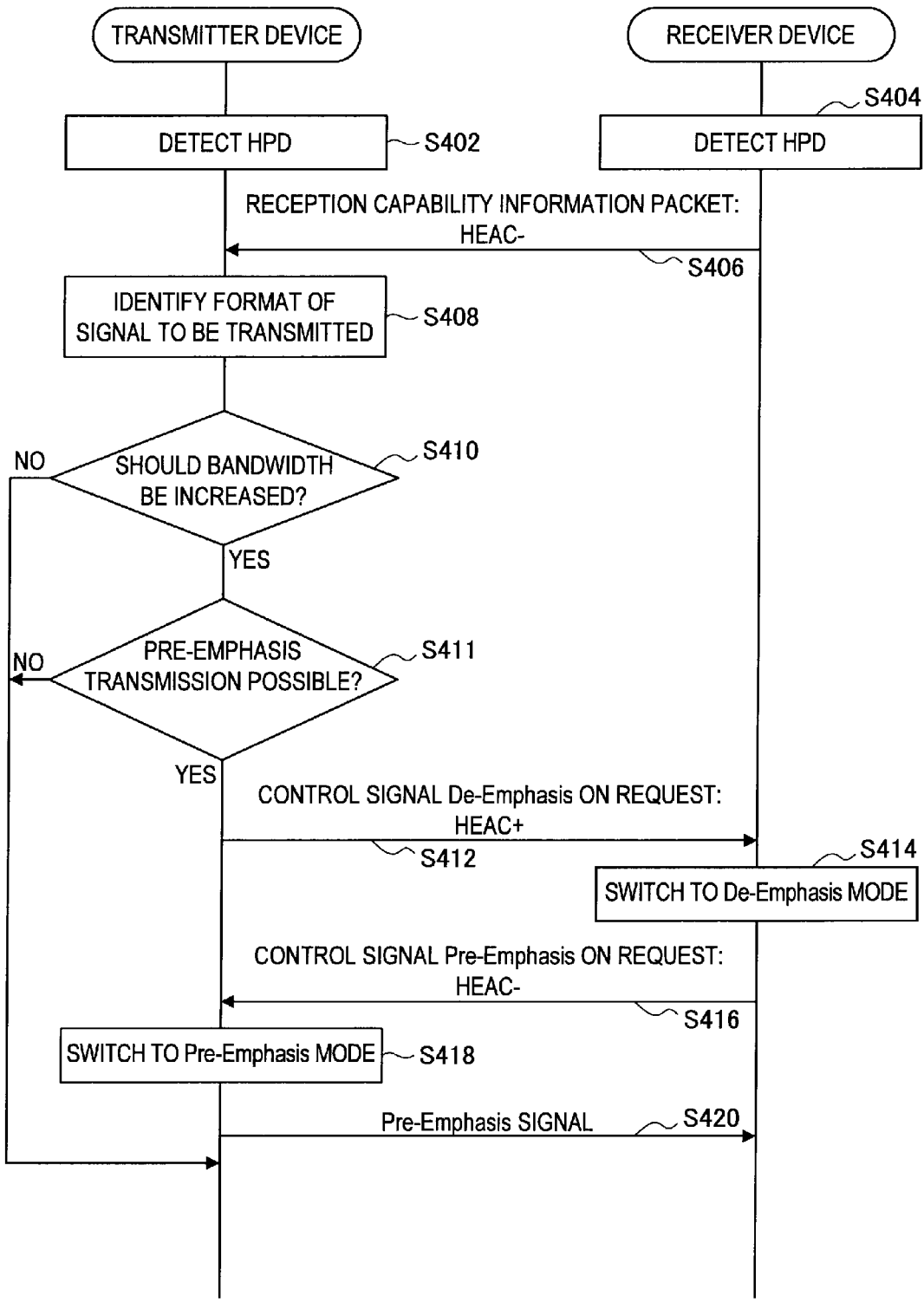
FIG. 10 is a sequence diagram showing a third example of the operation of switching the operation mode.

Next, the third embodiment will be described in which the operation mode is switched using packets of the Ethernet (Registered Trademark) through a HEAC, with reference to FIG. 10.

When the transmitter device 100 and the receiver device 200 are connected via a cable (S404), the transmitter device 100 supplies power to the EDID-ROM in the receiver device 200, and the receiver device 200 returns a HPD signal, whereby the transmitter device 100 detects the HPD (S402). Then, the reception control unit 230 transmits a packet, which indicates information on the reception capability of the receiver device 200, to the transmitter device 100 using the HEAC (S406).

Then, as in step S108 and step S110 in FIG. 6, the transmission control unit 130 identifies the format of a signal to be transmitted (S408), and determines if the bandwidth should be increased (S410).

If it is determined that the bandwidth should be increased in step S410, the transmission control unit 130 determines if the receiver device 200 is compatible with the pre-emphasis transmission on the basis of the packet indicating information on the reception capability, which has been received in step S406 (S411). Then, if the receiver device 200 is determined to be compatible with the pre-emphasis transmission, the transmission control unit 130 transmits control information for switching the receiver device 200 to the de-emphasis mode using a packet of the Ethernet (Registered Trademark) through the HEAC (S412).

The reception control unit 230, in accordance with the control information, switches the operation mode of the receiver device 200 to the de-emphasis mode (S414), and returns response information to the transmitter device 100 using a packet of the Ethernet (Registered Trademark) through the HEAC (S416).

The transmission control unit 130 switches the operation mode of the transmitter device 100 to the pre-emphasis mode in accordance with the response information received (S418), and starts transmission of a pre-emphasis signal (S420).

<5. Cable Structure>

Next, an exemplary structure of an HDMI cable proposed herein will be described with reference to FIG. 11 and FIG. 12.

As described above, performing pre-emphasis transmission allows an increase in the bandwidth. However, wideband transmission could increase inter pair skew and intra pair skew that are generated due to errors in the transmission path length. As a countermeasure against such skew, a cable structure is proposed that can accurately define the transmission path length.

Figure 11:
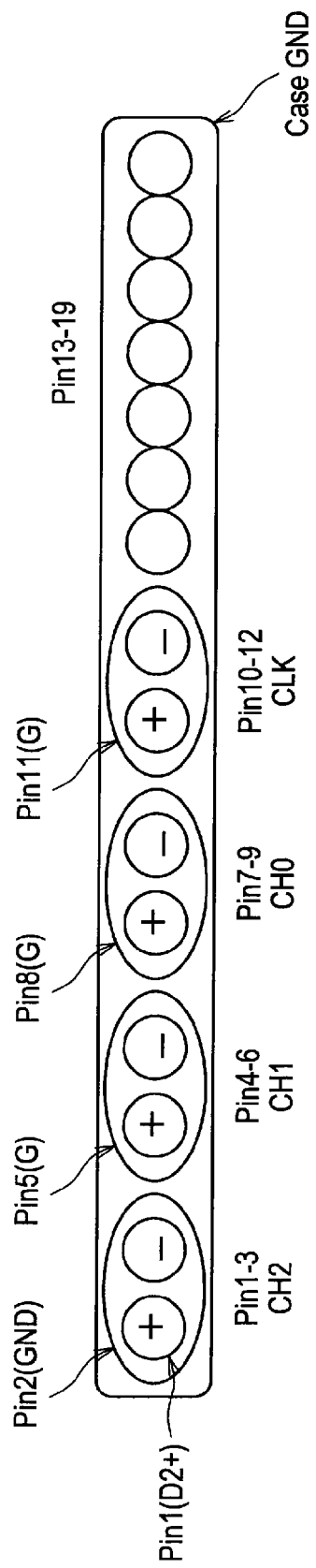
FIG. 11 is an explanatory diagram showing a first example of a cable structure that can accurately define the transmission path length.
Figure 12:
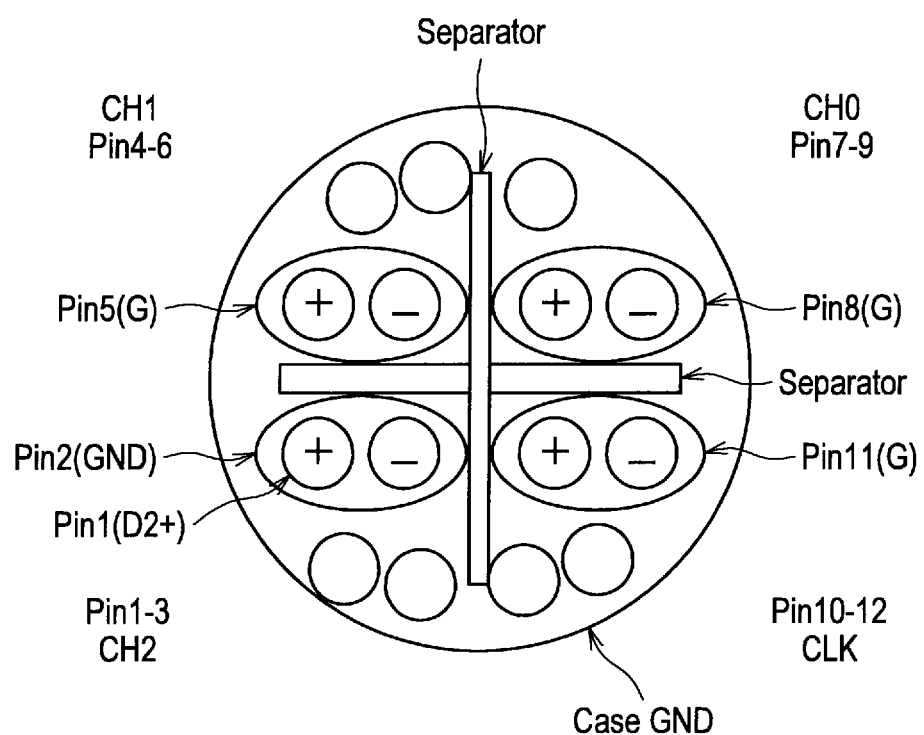
FIG. 12 is an explanatory diagram showing a second example of a cable structure that can accurately define the transmission path length.

For example, errors in the transmission path length can be minimized by adopting a flat structure as shown in FIG. 11. Alternatively, it is also possible to use a structure in which separators are provided to suppress generation of errors in the transmission path length.

<6. Examples of Advantageous Effect>

Hereinabove, a transmission system that can transmit both a pre-emphasis signal and a normal signal has been described. With such a structure, it is possible to transmit a pre-emphasis signal through a transmission path that has not been conventionally compatible with pre-emphasis signals. Accordingly, if the present invention is applied to the HDMI Ver. 1.3, for example, wide-band transmission that supports double the bandwidth of the conventional scheme becomes possible.

With the doubled transmission bandwidth, it is possible to transmit a signal in a format such as a large-screen format (2K×4K, 60 Hz, 8 bits) and a high frame rate (1K×2K, 240 Hz, 8 bits), with which the conventional HDMI is not compatible.

In addition, as a normal signal without a pre-emphasis process applied thereto can also be transmitted, upward compatibility with the conventional HDMI standard can be maintained.

Further, as the shape of the connector is unchanged, normal transmission can be performed between the device of the present invention and the conventional devices that are already in the market. Meanwhile, for transmission between the device of the present invention and pre-emphasis-compatible devices, the bandwidth can be increased in accordance with a signal format only when pre-emphasis transmission is necessary.

Although the preferred embodiments of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

For example, although the aforementioned embodiment describes a transmission system that can transmit both a pre-emphasis signal and a normal signal using the HDMI, the present invention is not limited to such example. For example, the present invention can be widely applied not only to the HDMI but also to a case in which a pre-emphasis function is added to a standard that is typically not compatible with the pre-emphasis.

Further, although the aforementioned embodiment describes a configuration in which the transmitter device only has a transmission function while the receiver device only has a reception function, the present invention is not limited to such example. For example, a transmitter/receiver device can be provided that has a combination of a transmitter unit, which is represented as the aforementioned transmitter device 100, and a receiver unit, which is represented as the aforementioned receiver device 200. Needless to say, in such a case, interface units and the like that are sharable can be constructed as a single functional unit.

In this specification, steps described in each sequence diagram include not only processes that are performed in time series in accordance with the order described in the sequence diagram, but also processes that are executed in parallel or individually. Further, needless to say, the order of the steps that are performed in time series may be changed as appropriate according to need.

What is claimed is:

1. A transmitter device comprising:
   an interface unit that is an interface for connection to a receiver device via a transmission path;
   a pre-emphasis unit configured to selectively operate in a pre-emphasis mode in which a pre-emphasis process is performed so as to generate a pre-emphasis signal or a normal mode in which the pre-emphasis process is not performed so as to generate a normal signal, the pre-emphasis process involving adding to an input signal another signal for compensating for a high-frequency component of the input signal; and
   a transmission control unit configured to (i) acquire identification information indicating whether or not the receiver device is capable of performing a process of receiving the pre-emphasis signal, and (ii) when the acquired identification information indicates the receiver device is capable of performing the process of receiving the pre-emphasis signal, to cause the pre-emphasis mode to be selected such that the pre-emphasis unit generates the pre-emphasis signal and to switch the receiver device to a state in which the receiver device is capable of performing the process of receiving the pre-emphasis signal, and (iii) when the acquired identification information indicates the receiver device is not capable of performing the process of receiving the pre-emphasis signal, to cause the normal mode to be selected such that the pre-emphasis unit generates the normal signal and to switch the receiver device to a state in which the receiver device is capable of performing the process of receiving the normal signal.

2. The transmitter device according to claim 1, wherein the transmission path is formed of a transmission channel included in a HDMI (High Definition Multimedia Interface) cable.

3. The transmitter device according to claim 2, wherein the identification information is represented by an identification bit in EDID (Extended Display Identification Data) that is stored in the receiver device.

4. The transmitter device according to claim 1, wherein the transmission control unit, upon receiving response information corresponding to the control information, causes the pre-emphasis unit to generate the pre-emphasis signal in accordance with the response information.

5. The transmitter device according to claim 4, wherein the transmission control unit receives the response information via a two-way transmission path.

6. The transmitter device according to claim 5, wherein the transmission control unit causes each of the control information and the response information to be transmitted or received using a CEC (Consumer Electronics Control) control signal.

7. The transmitter device according to claim 5, wherein the transmission control unit causes each of the control information and the response information to be transmitted or received using an HEAC (HDMI Ethernet (Registered Trademark) & Audio Return Channel) as the transmission path.

8. The transmitter device according to claim 2, wherein the transmission control unit causes the control information to be transmitted using an AVI (Auxiliary Video Information) InfoFrame.

9. The transmitter device according to claim 8, wherein the transmission control unit transmits the control information a plurality of times.

10. A transmission method comprising:
    a step of acquiring identification information indicating whether a receiver device that is connected to a transmitter device via a transmission path is capable of performing a process of receiving a pre-emphasis signal or a process of receiving a normal signal, the pre-emphasis signal being obtained by performing a pre-emphasis process which involves adding to an input signal another signal for compensating for a high-frequency component of the input signal and the normal signal being obtained without performing the pre-emphasis process;
    a step of transmitting control information to the receiver device in accordance with the identification information, the control information being for switching the receiver device to a first state in which the receiver device is capable of performing the process of receiving the pre-emphasis signal or a second state in which the receiver device is capable of performing the process of receiving the normal signal; and
    a step of transmitting the pre-emphasis signal to the receiver device when the acquired identification information indicates the receiver device is capable of performing the process of receiving the pre-emphasis signal, and transmitting the normal signal to the receiver device when the acquired identification information indicates the receiver device is capable of performing the process of receiving the normal signal.

11. A transmitter/receiver device comprising:
    a transmitter unit including
    a connector unit that is an interface for connection to a receiver unit via a transmission path;
    a pre-emphasis unit configured to selectively operate in a pre-emphasis mode in which a pre-emphasis process is performed so as to generate a pre-emphasis signal or a normal mode in which the pre-emphasis process is not performed so as to generate a normal signal, the pre-emphasis process involving adding to an input signal another signal for compensating for a high-frequency component of the input signal; and
    a transmission control unit configured to (i) acquire identification information indicating whether or not the receiver unit is capable of performing a process of receiving the pre-emphasis signal, and (ii) when the acquired identification information indicates the receiver unit is capable of performing the process of receiving the pre-emphasis signal, to cause the pre-emphasis mode to be selected such that the pre-emphasis unit generates the pre-emphasis signal and to cause control information to be supplied to the receiver unit to cause the receiver unit to be switched to a state in which the receiver unit is capable of performing the process of receiving the pre-emphasis signal, and (iii) when the acquired identification information indicates the receiver unit is not capable of performing the process of receiving the pre-emphasis signal, to cause the normal mode to be selected such that the pre-emphasis unit generates the normal signal and to switch the receiver unit to a state in which the receiver unit is capable of performing the process of receiving the normal signal and the receiver unit including a connector unit that is an interface for connection to the transmitter unit via the transmission path;

a reception processing unit configured to perform a process of receiving a signal from the transmitter unit; and a reception control unit configured to, upon receiving from the transmitter unit control information for switching the receiver device to a state in which the receiver device is capable of performing the process of receiving the pre-emphasis signal, switch the reception processing unit to the state in which the reception processing unit is capable of performing the process of receiving the pre-emphasis signal in accordance with the control information.

* * * * *